United States Patent [19]

Sekmakas et al.

[11] 4,085,020

[45] Apr. 18, 1978

[54] ELECTRODEPOSITION OF AQUEOUS DISPERSIONS OF COPOLYMERS OF POLYETHYLENICALLY UNSATURATED EPOXY-AMINE ADDUCTS

[75] Inventors: Kazys Sekmakas, Chicago; Raj Shah, Schaumburg, both of Ill.

[73] Assignee: DeSoto, Inc., Des Plaines, Ill.

[21] Appl. No.: 789,653

[22] Filed: Apr. 21, 1977

Related U.S. Application Data

[62] Division of Ser. No. 576,714, May 12, 1975.

[51] Int. Cl.² ............................................. C25D 13/06
[52] U.S. Cl. ................................................. 204/181 C
[58] Field of Search ...................................... 204/181 C

[56] References Cited

U.S. PATENT DOCUMENTS

3,719,626   3/1973   May .................................. 204/181 C

*Primary Examiner*—Howard S. Williams
*Attorney, Agent, or Firm*—Dressler, Goldsmith, Clement, Gordon & Shore, Ltd.

[57] ABSTRACT

Nongelled, amine functional polymers dispersible in water with the aid of a solubilizing acid are provided by copolymerizing (A) an ethylenically unsaturated hydroxy functional amine adduct free of epoxy groups and containing from about 1.4 to about 2.0 ethylenically unsaturated amine groups per molecule, formed from a polyepoxide having a 1,2-epoxy equivalency of from 1.4 to about 2.0 and at least a stoichiometric amount of an ethylenically unsaturated primary amine; and (B) copolymerizable monoethylenically unsaturated monomers, a portion of which is amine-functional. The water solutions are particularly useful to enable corrosion resistant coatings to be electrodeposited at the cathode.

8 Claims, No Drawings

ELECTRODEPOSITION OF AQUEOUS DISPERSIONS OF COPOLYMERS OF POLYETHYLENICALLY UNSATURATED EPOXY-AMINE ADDUCTS

This is a division, of application Ser. No. 576,714, filed 05/12/75.

This invention relates to copolymer of polyethylenically unsaturated epoxy-amine adducts, to stable aqueous dispersions containing the same at a pH close to neutral, and to the electrodeposition of such aqueous dispersions at the cathode of a unidirectional electrical system.

In accordance with this invention, amine functional polymers dispersible in water with the aid of a solubilizing acid are provided by copolymerizingl (A) an ethylenically unsaturated hydroxy functional amine adduct free of epoxy groups and containing from about 1.4 to about 2.0 ethylenically unsaturated amine groups per molecule, formed from a polyepoxide having a 1,2-epoxy equivalency of from 1.4 to about 2.0 and at least a stoichiometric amount of an ethylenically unsaturated primary amine; and (B) copolymerizable monoethylenically unsaturated monomers, a portion of which is amine-functional. The stoichiometry is between the amine group and the oxirane group, and the reaction is a simple addition reaction which forms an hydroxy group and a secondary amine group, and all of the epoxy groups are consumed in the addition reaction which forms the addition reaction product (adduct).

The copolymer is stably dispersible in water at a pH in excess of about 5.0, up to about 7.5, and it can be electrodeposited at the cathode, preferably together with an aminoplast curing agent, and cured to provide cured coatings which have many desirable properties. The high corrosion resistance is particularly outstanding (salt spray and detergent resistance), and the high gloss and hardness combined with reasonable flexibility are also impressive.

Referring more particularly to the organic diepoxide which is used, these should have a molecular weight of at least about 350. Since commercial epoxy resins are sometimes mixtures of diepoxides and monoepoxides, these can be used so long as the epoxy functionality is at least about 1.4. Polyepoxides having an epoxy functionality above about 2.0 lead to gelation.

The polyepoxides which are preferred are hydroxy functional polyepoxides having a linear aromatic backbone and a molecular weight in the range of from about 500 to about 6000, preferably 700 to about 4000. These include a significant hydroxy value (equivalents per 100 grams) of from about 0.2 to about 0.4 which participates in the final cure. These polyepoxides are more preferably diglycidyl ethers of bisphenols, such as bisphenol A, and have a 1,2-epoxy equivalency of 1.4 to 2.0.

From the standpoint of the commercially available materials, the Shell product Epon 1001 is preferred, this material having an average molecular weight of 1000, a melting point of 67°–74° C., an epoxy value of 0.20 equivalent per 100 grams, and an hydroxyl value of 0.32 equivalent per 100 grams. Other commercial epoxy resins of known characteristics which are also appropriate for use herein are Epon 834, Epon 864, Epon 1004 and Epon 1007.

The ethylenically unsaturated primary amine is subject to wide variation, and has the formula $RNH_2$. The R group in this formula may be any polymerizable ethylenically unsaturated hydrocarbon, including both monoethylenically unsaturated compounds and polyethylenically unsaturated compounds. The latter are more commercially available, being the amine counterparts of the drying and semi-drying fatty acids, such as soya fatty acid. The amine counterparts of oleic acid, linoleic acid and linolenic acid will further illustrate the useful polyethylenic materials. Allyl carbamate will illustrate the monoethylenic amines which are useful. The primary amine based on soya fatty acid is particularly preferred, being available in commerce with an amine value slightly in excess of 205, and containing about 98% primary amine. The unsaturation provided by the soya base provides an iodine value slightly in excess of 90. The commercial products Kemamine P-997 and Kemamine P-997D are particularly preferred (product of Humko Sheffield Chem. Co.)

The reaction between the primary amine and the epoxy groups is itself conventional, the reactants being cooked together at moderate temperature (60°–175° C.). An organic solvent may be present to facilitate reaction, especially inert water-miscible solvents, such as methyl ethyl ketone. The unsaturation is retained in this reaction to provide one unsaturated side chain for each epoxy group present in the original diepoxide.

By using an at least approximately stoichiometric proportion of unsaturated primary amine, all of the epoxy functionality can be consumed with minimum increase in molecular weight. It is to be observed that the unsaturation in the amine is inherently inert with respect to the amino hydrogen atoms. This is because any reactive unsaturation would be consumed by the amino hydrogen atoms, thus eliminating the unsaturation and the primary nature of the amine. As a result, any available ethylenically unsaturated primary amine is necessarily of the correct type and useful herein.

It is to be observed that, in line with conventional terminology as employed in commerce, functionality not recited in the naming of a class of compounds is not present unless otherwise state. Thus, an ethylenically unsaturated primary amine contains these two groups, and none other.

Excess unsaturated amine may be present, but it represents an unnecessary expense since it simply remains unreacted to be consumed in the subsequent copolymerization, and tertiary amines having acrylic unsaturation are preferred for incorporation in the copolymer.

The reaction of the diepoxide with the unsaturated primary amine produces a polyunsaturated hydroxy functional amine which is then copolymerized, preferably in organic solvent solution, with monoethylenically unsaturated monomers, preferably including a proportion of amine-functional monomer to produce an amine copolymer solution. The preferred solution copolymerization is itself conventional, the organic solvent being selected to be water miscible to ease the subsequent solubilization in water with the aid of an acid. Any water-miscible organic solvent may be utilized, such as methyl ethyl ketone, or 2-ethoxy ethanol, and the like.

Since there is more than one ethylenically unsaturated terminal group, this means that the original polyepoxide is now subject to polymer growth at more than one location. In preferred practice, we start with a diepoxide, and copolymer formation occurs at both ends of the molecule, and it is this aspect of the situation which enables physical and chemical resistance to be maximized without requiring undue acidity for the dissolution of the copolymer in water.

The polyunsaturated hydroxy functional amine should constitute from 5–75% of the copolymer, preferably from 20–60%. The balance of the copolymer should consist essentially of copolymerizable monoethylenically unsaturated monomers, a portion of which is normally amine-functional to enhance the desired water solubility with the aid of a solubilizing acid. Such solubility is aided by the presence of from 2–20%, preferably from 6–15%, based on the weight of the copolymer, of monoethylenically unsaturated amine. The amine may be primary, secondary, or tertiary, and, while monoamines are primarily contemplated, polyamines, and even hydroxy functional amines, are considered to be useful. Tertiary monoamines are particularly preferred to provide greatest solubility in water at highest pH.

As already indicated, the balance of the copolymer consists essentially of monoethylenic monomers. Considering first monomers which are not amine-functional, these may be reactive or nonreactive. Any nonreactive monoethylenic monomer such as styrene, vinyl toluene, methyl methacrylate, ethyl acrylate, dibutyl maleate, acrylonitrile, and the like is appropriate. The larger the proportion of hydroxy-functional polyethylenic unsaturated amine, the less nonreactive monoethylenic monomer will be used.

The monoethylenically unsaturated monomers used to form the amine copolymer will preferably include other water soluble reactive monomers, such as acrylamide, N-methylol acrylamide, or hydroxy ethyl acrylate to increase functional reactivity, especially with aminoplast or phenol formaldehyde curing agents which are desirably incorporated in the aqueous electrocoating bath for electrical codeposit at the cathode with the amine copolymers of this invention.

Reactive monoethylenic monomers are useful since they increase the reactive functionality, and they may also assist in helping solubility at the higher pH levels which are desired herein. On this basis, acrylamide, N-methylol acrylamide, hydroxyethyl acrylate, and similar monomers providing the amide, the N-methylol or the hydroxy group are desirably present, the total proportion of such reactive monomers being desirably in the range of from 5–30%, preferably in the range of 10–25%, based on the total weight of the polymer. The etherified N-methylol group is considered to be equivalent to the N-methylol group itself since the etherifying alcohol is released on baking.

The class of monoethylenic unsaturated amines is itself well known, this invention being illustrated by the commercially available material dimethyl aminopropyl methacrylate. However, dimethyl aminoethyl methacrylate, monomethyl aminoethyl methacrylate, aminoethyl methacrylate, and the corresponding acrylates, crotonates, and the like are all fully useful herein. Other amine-functional monomers are illustrated by aminoethyl methacrylate, and t-butyl aminoethyl methacrylate.

Monoethylenically unsaturated tertiary amino amides are also useful in this invention, and these have the formula:

$$CH_2=C-C-N-R_1-N\begin{matrix}R_2\\R_3\end{matrix}$$
$$\begin{matrix}X & O & H\end{matrix}$$

wherein X is hydrogen or methyl, $R_1$ is $C_1 - C_4$ alkylidene, and $R_2$ and $R_3$ are $C_1 - C_4$ alkyl, preferably both methyl.

These unsaturated amino amides are illustrated by dimethylaminopropyl methacrylamide which has the formula:

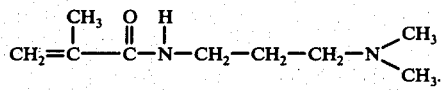

The corresponding acrylate is considered to be equivalent and the use of other alkylidene groups such as the methylidene, ethylidene, and butylidene groups, does not significantly alter the properties. While the dimethyl amino species is distinctly preferred, the corresponding diethyl, dipropyl, or dibutyl amino compounds are also useful.

Up to about 30% of the copolymer may be constituted by the above unsaturated amino amides, preferably from 5–15%.

It is desired to point out that the monomers which are useful in the production of amine copolymers which may be dissolved in water and applied by electrophoresis at the cathode are themselves well known, and the above discussion of appropriate monomers will have this in mind. There are two aspects of the situation which are unusual. First, a large proportion of the copolymer can be constituted by the hydroxy functional polyethylenic amine, and this is unusual because the copolymerization of monoethylenic monomers with polyethylenic polymers normally results in gelation. The polymers of this invention are nongelled. Second, the copolymerization which takes place at a plurality of locations in the hydroxy functional polyethylenic amine produces a resin which is both tough physically, and which is also highly soluble at a pH in the rage of 5.0–7.5.

Copolymerization is carried out in conventional fashion, the monomers being preferably dissolved in organic solvent (water miscible solvents are conveniently selected since they are desirably present in the final water dispersion) and heat is employed together with a conventional free radical generating catalyst to cause addition polymerization and the production of a linear soluble copolymer.

The copolymers which are dispersed in the electrocoating bath are desirably obtained and employed in the form of a solution in water miscible organic solvent, the solvent being desirably present in an amount of at least 10% by weight, based on the weight of the copolymers which are dispersed in the water phase. These water miscible solvents are preferably present in an amount not in excess of 150%, based on the weight of the dispersed copolymers. The solvent is most desirably present in an amount of from 30–125%, on the same basis. The class of water miscible organic solvents useful herein is well known, and these are illustrated in the accompanying examples.

From the standpoint of water solutions, it will be appreciated that the copolymers are dispersed in water with the aid of an acid which solubilizes the resin, the specific nature of the acid being of secondary significance. Inorganic acids such as hydrochloric acid or sulfuric acid are useful, through these do not provide the approximately neutral pH and noncorrosive environment which are preferred. It is presently preferred to employ organic acids such as formic acid, acetic acid, lactic acid or 2-pyridine carboxylic acid. Propionic acid and butyric acid are also useful. The preferred solubilizing acids can be characterized as saturated monocarboxylic acids having a dissociation constant in the range of from about 0.3 to about 5.6.

In the preferred practice of this invention, the final water solution is desired to have a pH in the range of 5-7.5, more preferably pH 6-7. When corrosion resistant equipment is available, lower pH can be tolerated.

Neutralization with acid in this invention is usually 50 to 100% of the amine groups, preferably from 60 to 90%.

It is desired that the aqueous coating compositions of this invention be thermosetting and the thermosetting cure is usually provided by the presence in the water medium of the coating of dispersed heat-hardening formaldehyde condensate.

The aqueous compositions of this invention containing the dispersed hydroxy functional acidic resin thus has incorporated therein from 5-40%, preferably 10-30%, based on the total weight of resin, of a heat-hardening formaldehyde condensate, which can be dispersed in the aqueous medium. The class of heat-hardening formaldehyde condensates is a well known class including aminoplast resins and phenolic resins. Typical aminoplast resins, all of which are formaldehyde condensates, are urea-formaldehyde, hexamethoxy methyl melamine and water dispersible transethers thereof with ethanol or other lower alcohol, benzoguanamine-formaldehyde and the like.

It is also possible to use heat-hardening water soluble or dispersible phenol-formaldehyde resins (phenolic resins), but since these do not include nitrogen atoms they do not have any strong tendency to migrate toward the cathode. To accentuate the desired electrophoretic movement, the water dispersible heat-hardening phenolic resin is heat reacted with the amine copolymer to cause a precondensation to take place, and the two resins to become compatibilized with one another. The fact of reaction is easily observed by the increase in viscosity which takes place. Thus, phenolic resins are useful herein, but it is usually preferred to avoid the needed precondensation, and an advantage of this invention is to obtain superior corrosion resistance without reliance upon phenolic resin.

Suitable phenolic resins are illustrated by the well known nongelled alkaline condensates of phenol with excess formaldehyde known as "A" stage resols.

The aqueous electrocoating bath is normally formulated to have a resin solids content in the range of 2-20%, preferably 5-15%, and the electrodeposited films are baked to cure the same, baking temperatures of 250° F. to 600° F. for periods varying from about 20 seconds at the highest temperature to about an hour at the lowest temperature being conventional. Preferred bakes are from 350° F. to 475° F. for from about 2 to 40 minutes.

Throughout this application, and in the examples and claims which follow, all parts are by weight unless otherwise specified.

EXAMPLE 1

Preparation of Diepoxide-Unsaturated Primary Amine Adduct

Part A 420 grams of fatty primary amine (Kemamine 997D may be used) containing iodine value of 90 and amine value of 210 were reacted with 1800 grams of diepoxide having an epoxide value of 900 (Epon 1004 — Shell may be used).

The reaction was conducted at 90° C. at 80% solids in methyl ethyl ketone for two hours.

Then methyl ethyl ketone was distilled off at 120° C. and the epoxy-amine adduct dissolved in 2-butoxy ethanol to adjust solids to 70% nonvolatile.

Part B — Preparation of Epoxy Interpolymer

Parts by Weight

300 — 2-Ethoxy ethanol — Charge into reactor and heat to 125° C.
151 — Dimethyl aminopropyl methacrylamide
590 — -Epoxy-amino adduct from Part A (70% solids)
300 — Styrene
100 — 2-Ethoxy ethanol
14 — Cumene-hydroperoxide
7 — Di-tertiary-butyl peroxide
10 — Tertiary dodecyl mercaptan.

Premix the above monomers and catalyst and add to the reactor, under constant agitation at a temperature of 125° C. Add over a 3½ hour period and hold 1 hour. Add 8 parts cumene-hydro peroxide and hold 1 hour. Add an additional 8 parts cumene hydro-peroxide and hold for 2 hours to complete the reaction.

The final characteristics of the epoxy polymers are:
Solids: — 59.4%
Viscosity (Gardner)$Z_6$ Preparation of Electrocoating Composition Parts by Weight 100 — Epoxy interpolymer of Example 1, Part B
20 — Methylated-ethylated benzoguanamine resin (XM 1123 - American Cyanamid) may be used.
10 — 2-Ethoxy ethanol
3.1 — Acetic Acid.

Premix the above, utilizing fast agitation. Then slowly add, with mixing, 700 parts deionized water to provide a colloidal dispersion having a solids content of 9.5% and a pH of 6.4.

Electrocoating Operation

The electrocoating operation is performed in a metal tank which is equipped with a magnetic stirrer. The tank serves as an anode and bare zinc phosphate treated steel panels are utilized as the cathode. Direct current is imposed on the metal container, and on the panels (cathode) from an external circuit. The results which are obtained are as follows:

| | |
|---|---|
| Deposition time: | 60 seconds |
| Film thickness (mil) | 0.6 |
| Gloss (60°) | 89 |
| Cure time | 20 minutes |
| Cure temperature | 450° F. |
| Pencil hardness | 6H |
| Flexibility (¼" conical mandrel) | Pass |
| Salt spray (5%) 500 hours | No rusting |
| 1% synthetic detergent solution at 165° F. | Pass 120 hours. |

The invention is defined in the claims which follow. We claim:

1. A method of electrodepositing a physically tough, corrosion resistant coating on the cathode of a unidirectional electrical system from an aqueous bath having a pH of 5.0–7.5 comprising passing a unidirectional electrical current through an aqueous electrocoat bath comprising a water dispersion having a resin solids content of from 2–20% by weight, said resin solids including a nongelled, amine-functional polymer dispersed in water with the aid of a solubilizing acid and curing agent therefor, said amine-functional polymer being a copolymer of:
- (A) an ethylenically unsaturated hydroxy functional amine adduct free of epoxy groups and containing from about 1.4 to about 2.0 ethylenically unsaturated amine groups per molecule, formed from a polyepoxide having a 1,2-epoxy equivalency of from about 1.4 to about 2.0 and at least a stoichiometric amount of an ethylenically unsaturated primary monoamine; and
- (B) copolymerizable monoethylenically unsaturated monomers, a portion of which is amine-functional; and said water dispersion further including an aminoplast or phenol-formaldehyde curing agent for said amine-functional polymer.

2. A method as recited in claim 1 in which said bath has a pH in the range of 6.0 – 7.0.

3. A method as recited in claim 1 in which said copolymer is solubilized with acetic acid.

4. A method as recited in claim 1 in which said copolymer is formed by copolymerization in organic solvent solution and is dissolved in said bath with said acid and from 10 to 150% of a water miscible organic solvent.

5. A method as recited in claim 1 in which said polyepoxide is a polyglycidyl ether of a bisphenol having a molecular weight of from about 700 to about 4000 and said primary monoamine adducted with said polyepoxide is derived from a drying or semi-drying fatty acid.

6. A method as recited in claim 1 in which said unsaturated hydroxy functional amine adduct constitutes from 5–75% of the polymer and said copolymer includes from 2–20% of copolymerized monoethylenically unsaturated tertiary amine.

7. A method as recited in claim 6 in which the tertiary amine functional monomer used is dimethyl aminopropyl methacrylamide.

8. A method as recited in claim 6 in which said unsaturated hydroxy functional amine adduct constitutes from 20–60% of the weight of the polymer, and the balance of the polymer consists essentially of copolymerized monoethylenically unsaturated monomer including from 6–15% of said copolymerized monoethylenically unsaturated tertiary amine.

* * * * *

UNITED STATES PATENT AND TRADEMARK OFFICE
CERTIFICATE OF CORRECTION

PATENT NO. : 4,085,020

DATED : April 18, 1978

INVENTOR(S) : Kazys Sekmakas and Raj Shah

It is certified that error appears in the above-identified patent and that said Letters Patent are hereby corrected as shown below:

Col. 1, line 17, "copolymerizingl" should read --copolymerizing--

Col. 4, line 38, "rage" should read --range--

Col. 5, line 6, "0.3" should read --3.0--

Claim 6, line 1, "claim 1" should read --claim 5--

*Signed and Sealed this*

*Twenty-second* Day of *August 1978*

[SEAL]

*Attest:*

RUTH C. MASON
*Attesting Officer*

DONALD W. BANNER
*Commissioner of Patents and Trademarks*